United States Patent Office 3,424,802
Patented Jan. 28, 1969

3,424,802
PROCESS FOR MANUFACTURING 2,5-DIMETHYLHYDROQUINONE
Walter Hafner, Furth, near Deisenhofen, Bavaria, Germany, assignor to Consortium fur Elektrochemische Industrie G.m.b.H., Munich, Bavaria, Germany, a corporation of Germany
No Drawing. Filed Mar. 21, 1966, Ser. No. 535,696
U.S. Cl. 260—621
Int. Cl. C07c 39/08, 39/06
3 Claims

ABSTRACT OF THE DISCLOSURE

This invention relates to manufacturing 2,5-dimethylhydroquinone, and it has for its object to provide a novel and improved process for this purpose. This is accomplished by heating diacetyl in an aqueous solution of 10–30 weight percent hydrogen sulfite to a temperature of 100° C. to 250° C.

---

2,5-dimethylhydroquinone can be used as a stabilizer and anti-oxidant, as part of photographic developers and for organic syntheses.

I have discovered a process for manufacturing 2,5-dimethylhydroquinone which involves heating diacetyl with aqueous hydrogen sulfite solutions to temperatures above 100° C. When the solution cools, the 2,5-dimethylhydroquinone crystallizes out and can be filtered off.

In carrying out my process temperatures of up to about 250° C., preferably 120 to 200° C., can be used. All hydrogen sulfites soluble in water, including the so-called metabisulfites, are suitable. Sulfites can also be added to the solutions. Particularly suitable are, for instance, 0.5 to 1.5 parts by weight sulfite to 1 part by weight of hydrogen sulfite. This produces a pH region between 5–7 which is favorable for the reaction. In the interest of a good conversion and good yields the solutions employed should not be diluted too much. Preferably solutions containing 10–30 weight percent of bisulfite are used.

Diacetyl usually occurs in small quantities as a by-product during the partial oxidation of $C_4$ hydrocarbons. In a particularly advantageous manner one can remove the diacetyl by extraction with aqueous hydrogen sulfite solutions from the oxidation products and, in accordance with the invention, transform it by simple heating into 2,5-dimethylhydroquinone. Aldehydes contained in the oxidation products which are also extracted by hydrogen sulfite, can be removed from the aqueous solution by pressure distillation (see Example 3 below).

EXAMPLE 1

In an autoclave with glass lining one heats 10 g. diacetyl with 41.5 cm.³ of a 29.5% NaHSO₃ solution for 1 hour to 190° C. After cooling the formed 2,5-dimethylhydroquinone is filtered off, washed with ice water and dried. Yield 1.35 g.

EXAMPLE 2

In an autoclave with glass lining one heats 200 cu. cm. of an aqueous solution of 40 g. Na₂SO₃, 20 g. NaHSO₃ and 7.1 g. diacetyl for 3 hours at 175° C. This is then cooled down, 20 cu. cm. of glacial acetic acid are added, and again heated for 1 hour at 175° C. After renewed cooling the crystallized 2,5-dimethylhydroquinone is filtered off, washed with ice water and dried. Yield 1.38 g.

EXAMPLE 3

Of a quantity of 250 cu. cm. of an aqueous solution containing 26 g. NaHSO₃, 31 g. Na₂SO₃, 10.1 g. diacetyl and 9 g. butyraldehyde, 75 cu. cm. of liquid were distilled off in a refined steel apparatus under 5 atmospheres excess pressure, which contained the bulk of the butyric aldehyde. When cooled, 2,5-dimethylhydroquinone was crystallized from the residue in the still. The product was filtered, washed with cold, slightly acetic water and dried. Yield 2 g.

EXAMPLE 4

250 cu. cm. of an aqueous solution, containing 25 g. NaHSO₃, 20 g. Na₂SO₃ and 9 g. diacetyl were heated in a refined steel apparatus for 90 minutes at 155 to 165° C. When cooled, 1.5 g. of 2,5-dimethylhydroquinone crystallized out from the solution.

EXAMPLE 5

62.5 g. NaHSO₃ and 31.25 g. Na₂SO₃ were dissolved in 170 cu. cm. of water. After 54.5 g. of diacetyl (about 95% pure) were added, water was added to make the volume 250 cu. cm. and the resulting solution was heated for 3 hours in the autoclave at 175° C. After cooling, the resulting 2,5-dimethylhydroquinone was filtered off, washed and dried. The yield was 9.2 g. of 2,5-dimethylhydroquinone.

The mother liquor was heated a second and third time for 3 hours at 175° C. Thereby formed further 2.38 and 0.88 g. respectively of dimethylhydroquinone. The total yield was 12.46 g. of 2,5-dimethylhydroquinone.

EXAMPLE 6

A solution of 0.535 g. potassium pyrosulfite, 0.16 g. potassium sulfite and 0.43 g. diacetyl was heated in 2 cu. cm. of water in a sealed glass tube for 3 hours at 150° C. When cooled, 0.043 g. of 2,5-dimethylhydroquinone crystallized out.

EXAMPLE 7

An aqueous suspension containing 1 mol/l. CaO, 1.15 mol/l. SO₂ and 1.1 mol/l. diacetyl, was heated for 3 hours at 150° C. The quantity of 2,5-dimethylhydroquinone obtained after cooling corresponded to about 6% of the diacetyl used.

EXAMPLE 8

5 cu. cm. of an aqueous suspension containing 0.34 g. MgO, 0.76 g. SO₂ and 1.1 g. diacetyl were heated for 3 hours to 150° C. The processing yielded 0.075 g. of 2,5-dimethylhydroquinone.

EXAMPLE 9

A solution of 2.2 g. potassium pyrosulfite, 1.2 g. sodium sulfite and 1.7 g. diacetyl in 100 cu. cm. water was heated for 3 hours in an autoclave at 160° C.

From the cooled-off solution 0.12 g. of 2,5-dimethylhydroquinone was obtained by extraction with ether.

The invention claimed is:

1. Process for manufacturing 2,5-dimethylhydroquinone which comprises heating diacetyl in an aqueous solution of 10–30 weight percent of a substance selected from the group consisting of sodium hydrogen sulfite, potassium hydrogen sulfite, calcium hydrogen sulfite, magnesium hydrogen sulfite, sodium pyrosulfite and potassium pyrosulfite to a temperature of 100° C.–250° C.

2. Process according to claim 1, in which the heating is performed at a temperature of 120° C.–200° C.

3. Process according to claim 1, characterized by the fact that 0.5–1.5 parts by weight of sodium or potassium sulfite are used for each 1 part by weight of hydrogen sulfite compound, and that the resulting solution has a pH range of 5–7.

References Cited

FOREIGN PATENTS 906,395  9/1962  Great Britain.

OTHER REFERENCES

Ber. Deut. Chem., vol. 35, p. 3298 (1902).

Brewster, R.: Organic Chemistry, New York, Prentice-Hall, 1953, p. 652.

LEON ZITVER, *Primary Examiner.*

H. ROBERTS, *Assistant Examiner.*